G. T. PETERS.
Method of Packing Herrings.
No. 207,980. Patented Sept. 10, 1878.
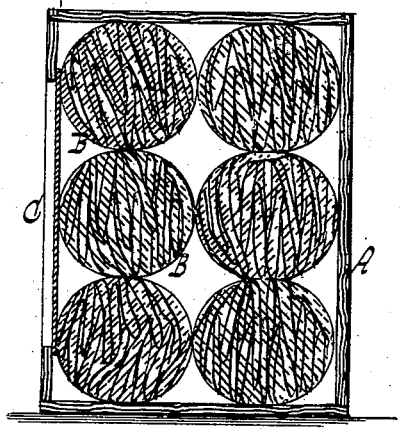
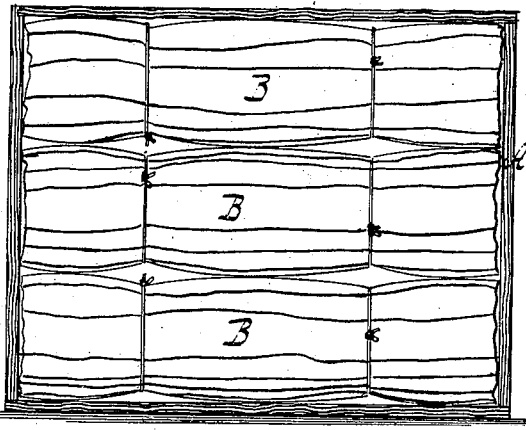
Witnesses.
Otto Hufeland.
W. C. Hauff.
Inventor
George T. Peters.
by
Van Santvoord & Hauff
his attorneys

UNITED STATES PATENT OFFICE.

GEORGE T. PETERS, OF JERSEY CITY HEIGHTS, NEW JERSEY.

IMPROVEMENT IN METHODS OF PACKING HERRINGS.

Specification forming part of Letters Patent No. 207,980, dated September 10, 1878; application filed July 26, 1878.

*To all whom it may concern:*

Be it known that I, GEORGE T. PETERS, of Jersey City Heights, in the county of Hudson and State of New Jersey, have invented a new and Improved Method of Packing Herrings, which invention is fully set forth in the following specification, reference being had to the accompanying drawing, in which—

Figure 1 represents a vertical cross-section of a package containing my invention. Fig. 2 is a longitudinal vertical section thereof.

Similar letters indicate corresponding parts.

The object of my invention is to pack herrings in such a way that they can be eaten directly upon their removal from the package—namely, without any further preparation; also, so that their flavor and moisture are preserved, and so that they are convenient for sale in small bunches or packages without weighing or counting the fish separately.

It consists in salting, smoking, skinning, and boning the herrings, then tying them in bunches, and, finally, putting them up in a box, as hereinafter fully set forth.

In the drawing, the letter A designates a box, and B are bunches of herrings put up therein according to my invention.

The box A may be made of wood or metal, and I prefer to introduce a pane of glass, C, in one of its sides, so that its contents are rendered visible from the outside thereof.

In carrying out my invention I salt and smoke the herrings in the usual way, then remove the skin therefrom, and extract the bone in any suitable manner.

By first smoking the herrings, the subsequent operations of skinning and boning the same are greatly facilitated. I then arrange the same in bunches of one dozen each (more or less) by tying that number together with a cord, and pack a half-dozen (more or less) of such bunches into a box of the proper size and shape. The herrings are thus packed up in such a condition that no further preparation thereof is needed, except perhaps to cut the same up on their removal from the package, wherefore they form a very useful article for tourists or travelers.

By skinning the herrings and putting the same up in bunches their raw flesh is brought in close contact, and by this means their inherent moisture and flavor are preserved in the best possible manner, the effect thereof being also increased by packing the bunches in a box, and another advantage of the bunching being that no time is lost in counting the herrings singly when a dozen or more are sold.

I am well aware that the practices of salting, smoking, skinning, and boning fish have long been known, and I therefore do not claim any of them as my invention.

What I claim as new, and desire to secure by Letters Patent, is—

The new commercial package consisting of salted, smoked, skinned, and boned herring tied together in bunches, which are packed in a suitable box, substantially as described.

In testimony that I claim the foregoing I hereunto set my hand and seal this 23d day of July, 1878.

GEORGE T. PETERS. [L. S.]

Witnesses:
W. HAUFF,
E. F. KASTENHUBER.